Sept. 3, 1963 J. R. STEINLE 3,102,358
FISHING ROD
Filed March 27, 1961 2 Sheets-Sheet 1
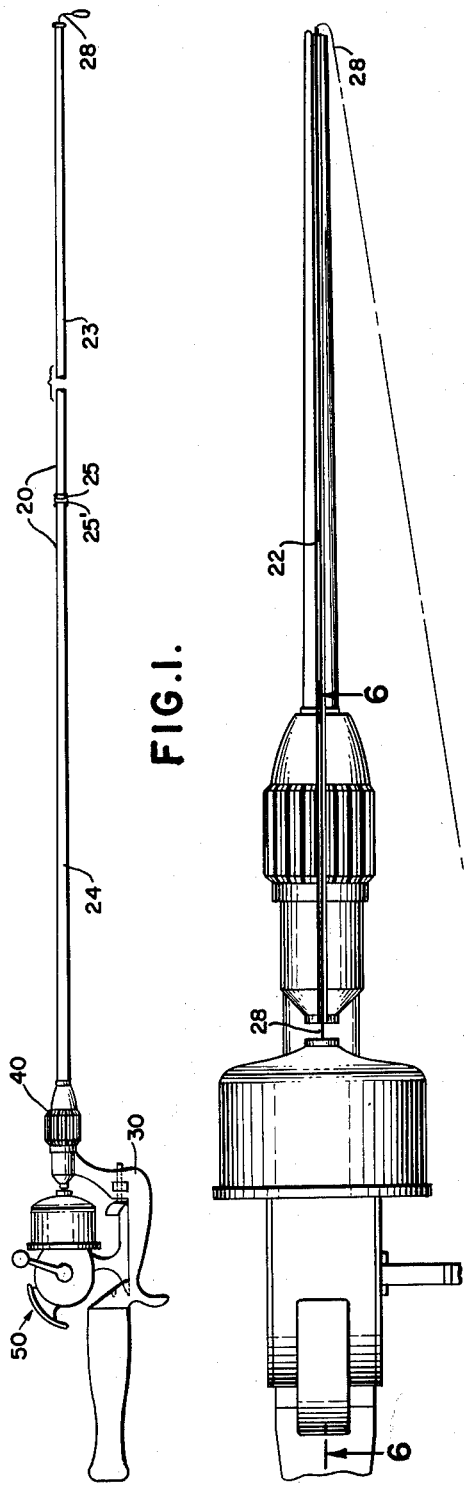
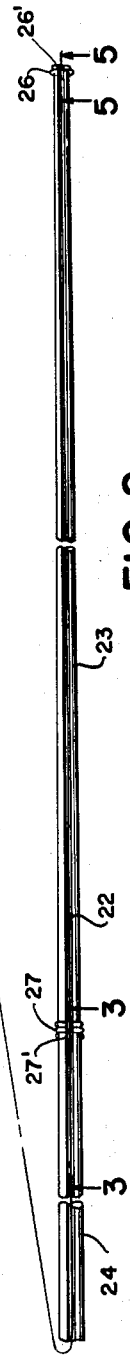
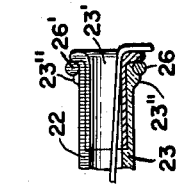
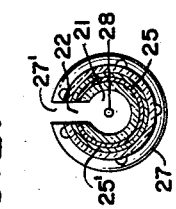
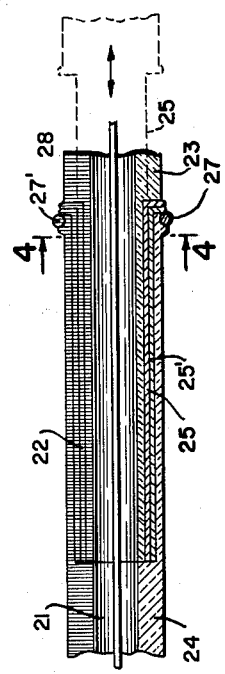
INVENTOR
James R. Steinle
BY Beale and Jones
ATTORNEYS Sept. 3, 1963 J. R. STEINLE 3,102,358
FISHING ROD
Filed March 27, 1961 2 Sheets-Sheet 2
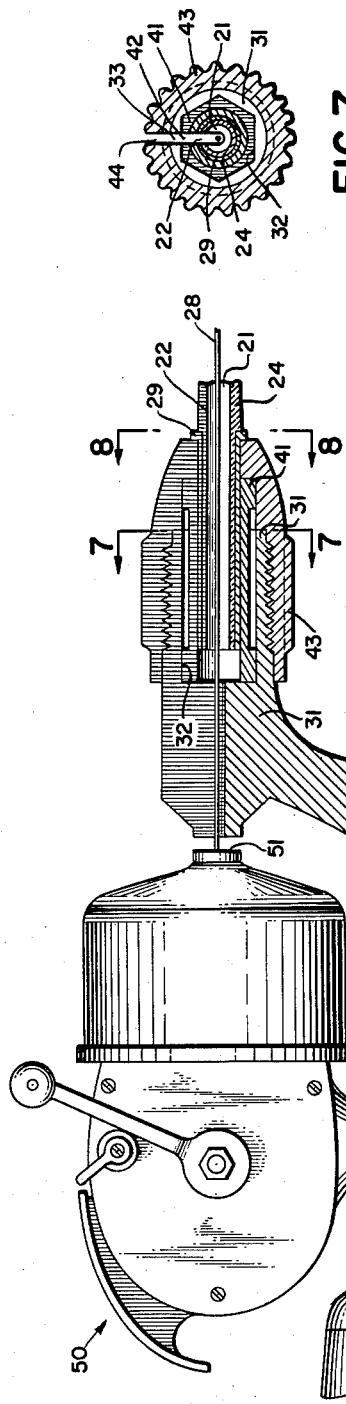
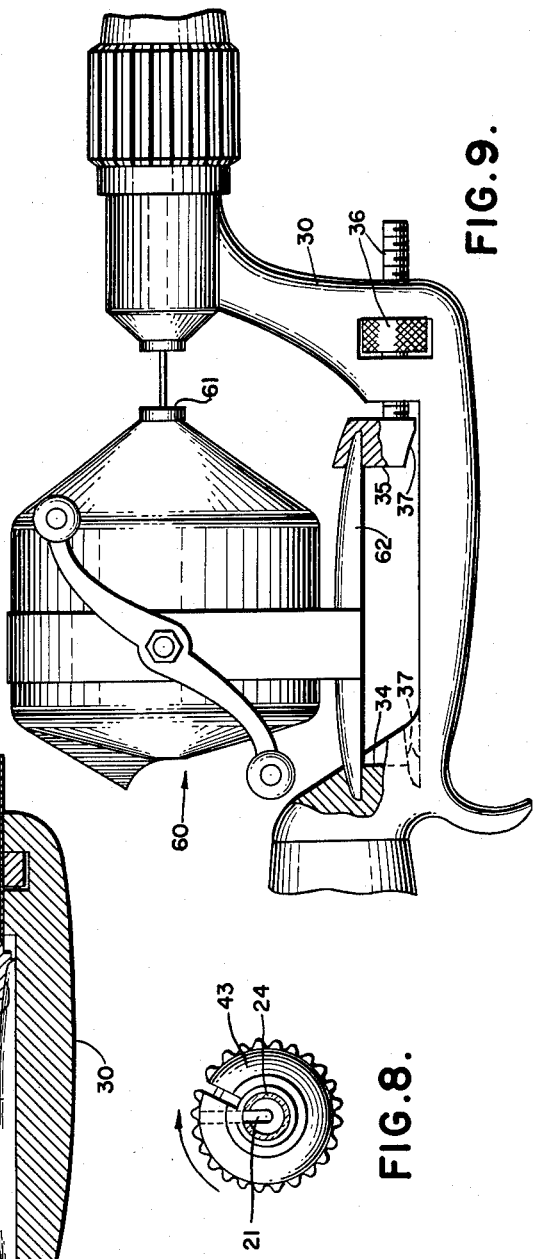
INVENTOR
James R. Steinle
BY Beale and Jones
ATTORNEYS

United States Patent Office 3,102,358
Patented Sept. 3, 1963

3,102,358
FISHING ROD
James R. Steinle, 800 N. Broadway, Greenville, Ohio
Filed Mar. 27, 1961, Ser. No. 98,600
5 Claims. (Cl. 43—22)

This invention relates to fishing rods and is directed to improvements in the type of rod in which the line leads from a reel on the handle out through a channel extending through the rod from end to end.

In fishing rods of this type it is sometimes difficult or time-consuming and awkward to thread the line through the rod. Another disadvantage with known fishing rods of this type is that usually only one size or make of reel can be used with the rod, because the fairlead or line guide on the reel, through which the line leads to the channel in the rod, must be aligned with the rod channel.

The primary object of the present invention is to provide a novel fishing rod of the type described which overcomes the above disadvantages.

In accordance with the invention I provide a fishing rod having a channel through it from end to end, a slot throughout the length of the rod opening into the channel for introducing a line into the channel from a lateral side, and means for covering and uncovering the slot at least at the outer end of the rod, so as to retain the line in the channel. Preferably I also provide a handle having means for mounting different reels so that the reel fairlead will be aligned with the rod channel.

Other objects and advantages will be apparent from the following description and the appended drawings; in which:

FIG. 1 is a side elevation of a fishing rod made in accordance with my invention;

FIG. 2 is an enlarged plan view of the same, portions being omitted;

FIG. 3 is a fragmentary section taken on line 3—3 of FIG. 2;

FIG. 4 is a section taken on line 4—4 of FIG. 3;

FIG. 5 is a fragmentary section taken on line 5—5 of FIG. 2;

FIG. 6 is a fragmentary side elevation, partly in section on line 6—6 of FIG. 2, and enlarged with respect thereto;

FIG. 7 is a section taken on line 7—7 of FIG. 6;

FIG. 8 is a section taken on line 8—8 of FIG. 6 with one part in a different adjusted position; and FIG. 9 is a view similar to FIG. 6, showing a different reel mounted on the fishing rod handle.

Referring now to the drawings, in which like characters refer to the same or similar parts, there is shown a fishing rod make in accordance with my invention, comprising a rod 20 detachably connected to a handle 30 by means of a clamp or chuck 40. The rod may be made in a single piece or in sections. In this embodiment there are two sections.

Rod 20 is of tubular, tapered construction with a line channel 21 extending therethrough from end to end, so that a line may be inserted laterally, or from the top, rather than being threaded through it from end to end. Preferably the rod is formed in sections 23, 24 detachably joined by friction socket members or ferrules 25, 25' which are split to provide a portion of the continuous slot or lateral opening 22. The rod proper preferably is formed of glass fiber laminated with a suitable thermosetting resin and socket members of suitable metal, e.g. stainless steel, adhesively bonded to the respective sections of glass fiber rods.

Rotatably mounted on the outer end of front section 23 is a ring 26 which is split by a lateral opening 26'. Ring 26 is retained against longitudinal displacement between a ferrule 23' in the end of rod section 23 and raised portions 23" on said section. Rotatably mounted on the outer end of rear section 24 is a similar split ring 27 having a lateral opening 27', which is retained against longitudinal displacement in a similar manner. Rings 26 and 27 provide rotationally displaceable line retaining means for inserting a fishing line 28 laterally in rod 20 and retaining it therein.

Although not necessary, the read end of rear section 24 preferably is provided with a stainless steel ferrule 29 which, like the fittings 25, is split to provide a portion of lateral opening 22. Ferrule 29 provides a surface for clamping rod 20 in clamp 40.

Handle 30 has a forwardly extending front end portion 31 with a longitudinal line channel open at both ends, and a socket or enlarged cavity 32 of hexagonal transverse cross section in the front end. A lateral opening 33 extends through the wall of portion 31 from front to rear, with which lateral opening 22 of the rod is aligned on assembly. Chuck 40 comprises a resilient split thimble 41 disposed in and extending forwardly out of socket 32. Thimble 41 has a hexagonal outer surface which fits the hexagonal socket 32 and is split from front to rear by a lateral opening 42 which is aligned with lateral opening 33, and thus with lateral opening 22. A split clamping ring 43 of comparatively heavy cross-section is threadedly mounted on front end portion 31, and it too has a lateral opening 44 from end to end. Opening 44 may be aligned with the other lateral openings 42, 33 and 22 as illustrated in FIG. 7 so as to leave an opening in the assembly for inserting fishing line 28 laterally. Then clamping ring 43 may be rotated as illustrated in FIG. 8 to compress thimble 41 against rod 20. At the same time ring 43 closes the lateral opening, so as to retain the fishing line in the line channel 21.

In order to provide a fishing rod of the hollow rod or line channel type which can be used with different sizes of reels, handle 30 is provided with novel means for clamping different reels in place with the fairlead or line guide of the reel aligned with the axis of line channel 21. As best shown in FIGS. 6 and 9, means is provided for clamping either of two different reels 50 and 60, each having a different distance between its fairlead or line guide 51 or 61 and its elongate mounting base 52 or 62. The clamping means comprises a fixed jaw 34, an opposed movable jaw 35, means 36 comprising a threaded bolt slidably mounted in handle 30 and a nut for moving them toward and away from each other, and opposed surfaces 37 and 38 on each jaw adapted to engage the respective reel mounting bases. Opposed surfaces 37 are adapted to engage base 52 of reel 50 to clamp it in position with line guide 51 aligned with the axis of line channel 21. Similarly, opposed surfaces 38 are adapted to clamp reel 60 in correct position.

The operation of the reel will be apparent from the foregoing description. The selected reel may be clamped on the handle, the rod sections assembled on the handle with the lateral openings all aligned with channel 22, a short length of the line pulled from the reel and moved laterally through the several aligned openings, the several rings rotated to retain the line, and the clamping chuck set up tight. The reverse procedure may be followed to disassemble, or to change reels.

Although a single embodiment has been described and illustrated, numerous modifications within the scope of the appended claims will be apparent to those skilled in the art.

I claim:
1. A fishing rod comprising a handle having a raised, forwardly extending front end portion and a rod portion extending forwardly from said front end portion, said portions having a line channel extending therethrough along a common axis, said channel extending from the inner end of said front end portion to the outer end of said rod portion, said portions having a lateral opening into said channel throughout the length thereof, a reel clamp on said handle for clamping a reel thereon, said reel having a line guide, said clamp clamping said reel with its line guide disposed in alignment with said common axis, and displaceable line retaining means on said rod for retaining within said channel a line extending outwardly from said line guide, and for releasing said line for bodily lateral movement out of said channel through said lateral opening.

2. A fishing rod as defined by claim 1, said means comprising a ring rotatably mounted on said rod, said ring having a lateral opening which may be rotated into position abreast the lateral opening into said channel.

3. A fishing rod as defined by claim 2, said rod portion comprising adjacent sections detachably connected at their abutting ends by a socket on the end of one section which frictionally receives the adjacent end of the other section, said ring being rotatably mounted over said socket, and a second ring with a lateral opening therein rotatably mounted on the outer end of said fishing rod.

4. A fishing rod in combination with a handle, said rod having a line channel extending therethrough from end to end, a lateral opening into said channel extending from end to end of said rod, and displaceable line retaining means mounted on said rod at a place therealong, said means having a first position in which it covers said opening at said place and a second position in which it leaves said opening open, said handle having a forwardly extending front end portion with a line channel extending therethrough from end to end, said front end portion having a lateral opening throughout its length opening into said channel and adapted for alignment with the lateral opening of said rod, a chuck mounted on said front end portion comprising a resilient split thimble and a split clamping ring threadedly mounted on said front end portion for engaging said thimble, said clamping ring being adapted to engage said thimble to compress it radially to grip an end of said fishing rod inserted into said thimble, said thimble being split from front to rear throughout its length to provide a lateral opening aligned with the lateral openings in said front end portion and said fishing rod, said clamping ring being split from front to rear throughout its length to provide a lateral opening which may be brought into alignment with the lateral openings in said front end portion, thimble, and fishing rod to provide an opening through which a fishing line may be inserted laterally into said front end and into said channel in the fishing rod.

5. A fishing rod having a line channel extending therethrough from end to end and a handle at the inner end, said handle having a front portion with a longitudinal channel extending therethrough, said last named channel being coaxial with and forming an extension of said line channel, reel clamping means on said handle for selectively mounting either of two reels thereon, each of said reels having a mounting base and a line guide spaced therefrom, one of said reels having its line guide spaced a first distance from its mounting base, the other of said reels having its line guide spaced a second distance from its mounting base, said reel clamping means comprising a pair of opposed jaws disposed transversely to and spaced laterally from the axis of said line channel along a line parallel to said axis, each said jaw having two mounting base engaging means spaced laterally from said axis respectively said first and second distances, and means for moving said jaws relatively toward and away from each other to clamp one of said reels in said handle with its line guide disposed on said axis and its mounting base engaged by an opposed pair of said mounting base engaging means.

References Cited in the file of this patent
UNITED STATES PATENTS

| | | |
|---|---|---|
| 1,157,106 | Heinrich | Oct. 19, 1915 |
| 1,463,084 | Hudson | July 24, 1923 |
| 1,595,275 | White | Aug. 10, 1926 |
| 1,962,869 | Heddon | June 12, 1934 |
| 2,282,618 | Stewart | May 12, 1942 |
| 2,691,840 | Smith | Oct. 19, 1954 |
| 2,702,192 | Warth | Feb. 15, 1955 |
| 2,729,012 | Lee | Jan. 3, 1956 |
| 2,753,646 | Colmery | July 10, 1956 |
| 2,880,546 | Pemberton | Apr. 7, 1959 |

FOREIGN PATENTS

| | | |
|---|---|---|
| 1,220,089 | France | Jan. 4, 1960 |